Oct. 25, 1966 R. L. KUNTZ 3,280,470

METHOD AND APPARATUS FOR OVEN DEHYDRATING COMPOUNDS

Filed July 23, 1964 2 Sheets-Sheet 1

INVENTOR
ROBERT L. KUNTZ
BY
ATTORNEYS

Oct. 25, 1966 R. L. KUNTZ 3,280,470
METHOD AND APPARATUS FOR OVEN DEHYDRATING COMPOUNDS
Filed July 23, 1964 2 Sheets-Sheet 2
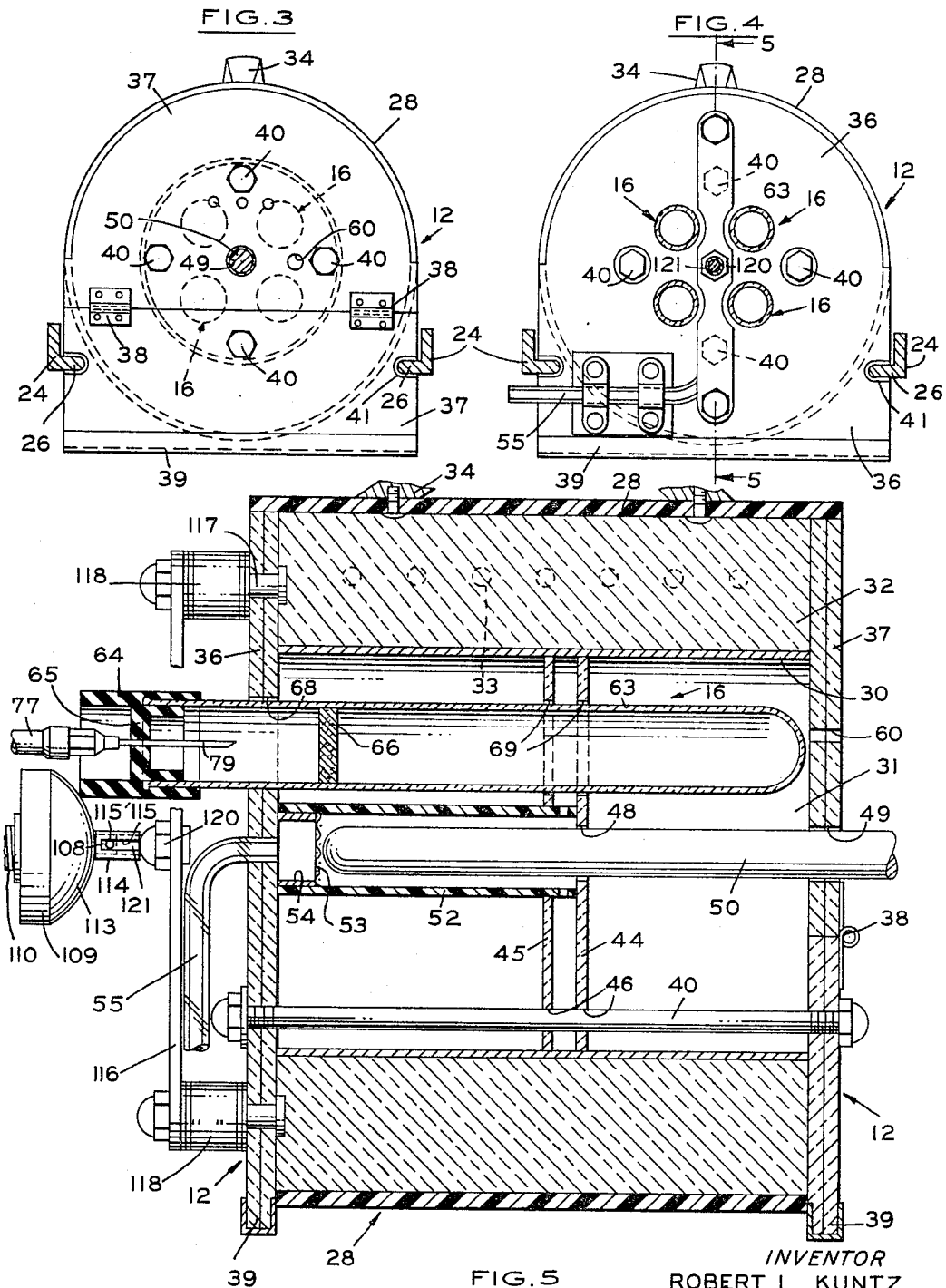
INVENTOR
ROBERT L. KUNTZ
BY *Whittemore, Hulbert*
*Belknap*
ATTORNEYS United States Patent Office 3,280,470
Patented Oct. 25, 1966

3,280,470
METHOD AND APPARATUS FOR OVEN DEHYDRATING COMPOUNDS
Robert L. Kuntz, 9850 Yorkshire, Detroit, Mich.
Filed July 23, 1964, Ser. No. 384,671
19 Claims. (Cl. 34—5)

The present invention relates to improvements in a method and an apparatus for oven-dehydrating compounds, and, more particularly, for determining the content of water of hydration of chemical compounds by an improved, high vacuum-heat evaporation procedure. This procedure makes the evaluation possible at a moderate temperature, in a very short time interval, as compared with present technique, and without deterioration or discoloration of the compound such as is likely to result from oxidation in pursuing known procedures to obtain a complete drying of a sample. While quantitative analyses hereinafter set forth were arrived at in a typical determination of the water of hydration in ferrous sulfate heptahydrate ($FeSO_4 \cdot 7H_2O$), it is evident that similar determinations can be made with equal success on numerous institutionally and industrially employed hydrates; and the advantages of the present method and apparatus are very significant when one must consider practical factors of time, cost and size of equipment, possible temperature discoloration, decomposition and/or oxidation of the compound, and the like.

Standard texts and references (such as Merck's Index, 7th Edition) inform that the instanced hydrate, $FeSO_4 \cdot 7H_2O$, has a theoretical water of hydration amounting to 45.36%, that it loses 5 moles of water at 70° C.–80° C., an additional mole at 100° C. and the last mole at 300° C., and that it decomposes at higher temperatures. However, the literature does not state whether the above findings were made by test at atmospheric or subatmospheric conditions, and it is a fact that at atmospheric pressure an instanced ferrous sulfate sample would be readily oxidized to ferric sulfate ($Fe_2(SO_4)_3$), particularly at the elevated temperatures of 100° C.–300° C. Furthermore, we are not textually advised as to the time duration required to completely dehydrate the sample.

Accordingly, since it is desirable to assay a sample after drying, and still as the chemically unchanged compound, attempts have been made by me to obtain the dehydration under a vacuum condition, using a conventional technique, with temperatures, times and percentages of water removed being carefully recorded.

Utilizing a conventional laboratory vacuum oven over phosphorous pentoxide, samples were first dried at 60° C. and 75° C. With the oven and its lines well sealed, a manometer reading showed limitations of 6 mm. to 8 mm. maxima of pressure. Time required to remove the first 4 to 5 moles of water was 18 hours at 60° C. and 16 hours at 75° C., whether the sample was pulverized prior to drying or was diced to 30 mesh particle size. Additional attempts were made to effect dehydration at 125° C. and 150° C., again under available vacuum and using $P_2O_5$. Under these conditions 37% of water was removed at 125° C. and 41.6% at 150° C., which was the highest temperature afforded by the oven employed.

Moreover, samples dried in this manner were found to be discolored from a dark grey to almost black, no doubt due to unavoidable oxidation resulting from the imperfect vacuum. Perhaps the difficulty could have been overcome by employing a larger capacity vacuum pump, but this would have considerably increased the cost of the equipment, and still without insurance of much reducing the excessive time factor and/or deterioration due to oxidation.

Consequently, the method aspect of the present invention evolves from the concept of desiccating a small and accurately weighed sample of the compound in question, not in a comparatively large piece of available and conventional oven equipment, but rather in a much smaller drier vessel heated in a correspondingly smaller oven. Such oven may be operated at a moderate heat, and with the sample in the vessel under a vacuum of a value substantially higher than is obtainable in most laboratory oven equipment. Thus one may obtain a 100% dehydration of the small assay sample quickly, using equipment of slight cost. It is to be seen that the apparatus aspect of the invention is closely tied to the method concept.

Another object of the invention is to provide a method and apparatus of the sort referred to which can produce a sample that is dehydrated as desired, but otherwise physically and chemically unchanged from the initial hydrate.

A further object of the invention is to provide apparatus for the purpose described which is so compact and light in weight as to be hand-portable, as well as being very cheap to make.

Furthermore, the improved equipment may be safely used under the prevailing conditions of temperature and vacuum. That is, it protects itself, for example, from damage as the result of a possible implosion under such conditions. Thus, in the event plural samples of incompatible compounds are being simultaneously heat- and vacuum-dried, contamination of one thereof is prevented in the event of an implosion affecting one of the others. This is particularly of significance if the materials dehydrated are very expensive.

More specifically, the apparatus of the invention comprises a small and readily portable oven electrically heated by a removable immersion heater of readily available type, the heating chamber of the oven being well insulated thermally. The oven has provisions to removably receive in its heating space or chamber a plurality of the small size vacuum vessels containing the samples under analysis, such vessels being preferably in the form of readily available heat resistant laboratory test tubes. Further, the oven apparatus is associated with means for simultaneously rotating the sample tubes about individual parallel axes as heating proceeds, for a quick and uniform desiccation of each sample throughout; and a high vacuum is applied to each tube interior through the agency of a hypodermic needle piercing a sealing closure for the tube.

In addition, the vacuum tubes or vessels serve as weighing receptacles or dishes in the performance of certain quantative weighing steps in the practice of the method of the invention, without exposing the material therein before or after desiccation.

Still further and specifically, in regard to the apparatus, the invention affords a multiple valve unit providing an individual valve check for each of the hypodermic needle-equipped vacuum lines, so that protection is afforded against a possible implosion, as mentioned above.

Generally speaking, the apparatus of the invention comprehends a combination of an improved portable, electrically heated vacuum oven with improved auxiliary multiple valve control and operating means by which a desired high vacuum and heated dehydration of individual samples of a compound or compounds may be carried out efficiently and quickly. The invention in the apparatus also concerns these oven and valve components, individually and per se.

The foregoing as well as other objects will become more apparent as this description proceeds, especially when considered in connection with the accompanying drawings illustrating the invention, wherein:

FIG. 3 is an end elevational view, as along the vertical section line 3—3 of FIG. 2, of the drying oven, as mounted upon guide rails of the assembly;

FIG. 4 is an opposite end elevational view, as from vertical section line 4—4 of FIG. 2;

Figure 2:
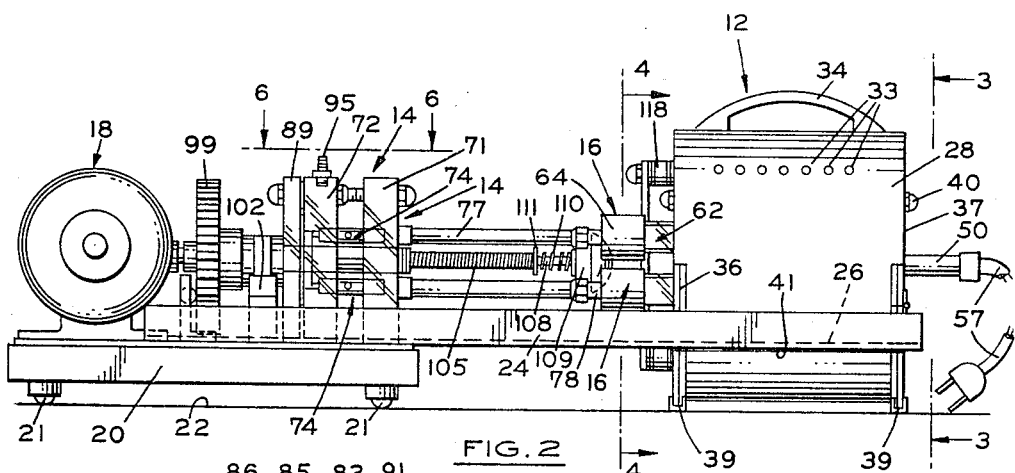
FIG. 2 is a side elevation of the assembly.
Figure 6:
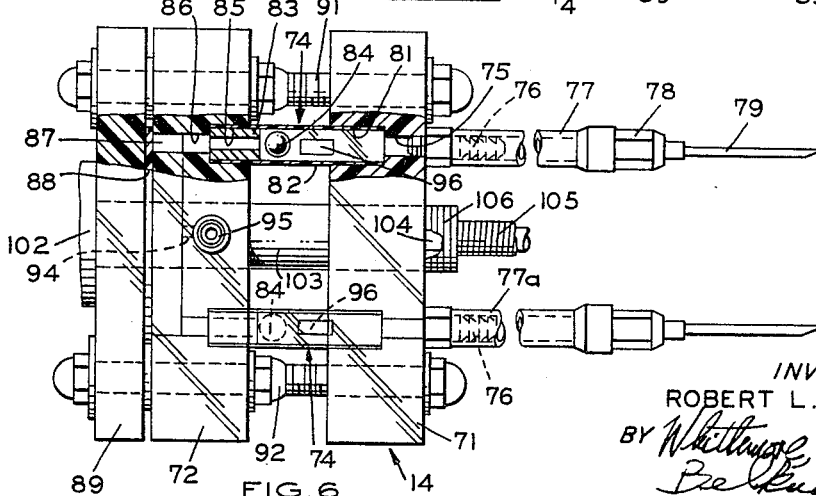

FIG. 5 is an approximately actual size view, partially broken away, in vertical section along broken line 5—5 of FIG. 4, showing one of four tubular vacuum vessels as operatively received in the oven, as well as part of the provisions for the motor driven rotation of the same, and for the evacuation of vapor from the vessel's interior, and an immersion heater which constitutes a removable heat source for the oven; and FIG. 6 is a similarly scaled top plan view, as from line 6—6 of FIG. 2, this view being partially broken away and in horizontal section to illustrate features of a multiple vacuum valve unit associated with the drying oven.

The improved combination of a vacuum-type drying oven and a multiple check valve unit therefor is generally designated by the reference numeral 10. It comprises three basic components, namely a portable drying oven proper, designated 12; a protective multiple check valve unit 14 safeguarding the application of sub-atmospheric pressure to certain tubular vacuum vessels 16 removably associated with oven 12; and a reduction-geared drive motor 18 which rotates the vacuum vessels (shown as four in number) about the individual axes thereof, as they are being heated by oven unit 12 and evacuated through valve unit 14.

Figure 1:
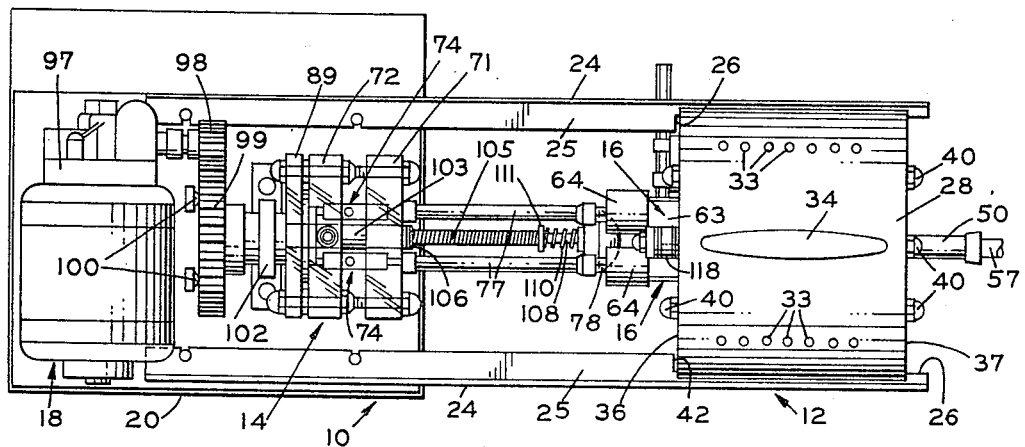
FIG. 1 is a top plan view showing the full assembly of the portable drying oven, the multiple check valve unit, and the operating components of the invention.

The multiple check vacuum valve 14 and motor 18 are shown as being fixedly mounted upon an appropriate flat base carriage 20 equipped with ball casters 21, by which it may be movably mounted on a supporting surface 22 to roll into and out of an appropriate cabinet or other housing (not shown). Carriage 20 has a pair of like elongated guide rails 24 of L-cross section fixedly mounted on the top thereof to extend parallel to one another a substantial distance outwardly of an end of the carriage, to the right as shown in FIGS. 1 and 2; and the coplanar horizontal flanges of these rails are cut away at 26 adjacent the outer ends thereof. In these relieved zones, the rails removably receive the oven proper 12 through the agency of certain guide means of the latter, to be described. Hence the oven may be slidingly withdrawn from the associated valve and motor structures 14, 18 when and if it is desired to transport the oven alone.

The oven unit 12 is of relatively small size and slight weight, approximating 5 pounds. By reason of its assembly of simple structural features hereinafter described it can be constructed at a cost which is nominal in the extreme compared to the cost of a conventional oven. Over 12 comprises an external cylindrical shell or casing 28 of a suitable rigid plastic material in an outer diameter of, say, 6 inches and an axial length of about 5 inches; and as assembled with end walls (also to be described) it occupies approximately one thirtieth the space of a conventional vacuum oven.

Concentrically arranged within this casing there is disposed a rigid cylindrical oven wall 30 of steel, in an outer diameter of about 3 to 3½ inches, which defines the oven heating chamber 31; and the annular space between casing 28 and wall 30 is filled with fiberglass thermal insulation material 32. Casing 28 is provided with perforations 33 through its wall (FIGS. 1 and 2) for ventilation of the insulation filled space, and is equipped at its top with a carrying handle 34.

One axial end of the oven 12 (left-hand in FIG. 5) is closed by a two-ply end wall 36 of stiff asbestos board or sheeting, the opposite end wall being similarly closed by a two-ply asbestos end wall 37; and if desired, the end wall 37 may be subdivided into two parts swingably articulated to one another by hinges 38 (FIG. 3) for access to the oven interior 31. As indicated in FIGS. 3, 4 and 5, upper arcuate portions of the asbestos walls 36, 37 are inset within the axial ends of the casing 28; and these walls have generally rectangular bottom portions terminating in horizontal, metal-clad legs 39 for stability of support of the oven 12 when removed from the rails 24.

As also shown in FIGS. 3, 4 and 5, four elongated through-bolts or studs 40, arranged in equally spaced relation to one another about the axis of the shell or casing 28, extend through the end walls 36, 37 and chamber 31, drawing the walls into inwardly abutting engagement with the ends of cylindrical oven wall 30, thus to hold the last named walls in fixed relation to the casing 28 and wall 30 to constitute a basic rigid, unitary and portable oven structure of small size.

Referring to FIGS. 3 and 4, the asbestos oven end walls 36, 37 are each provided with horizontally aligned notches receiving a pair of elongated metal guide shoes 41 in parallel horizontal relation to one another. These shoes each slidably mate about the reduced flange formations 26 (FIGS. 1 and 2) of the guide rails 24, and the inner ends of the relieved portions 26 provide shoulders 42 against which the oven wall 36 may abut to position the oven proper 12 operatively to the remainder of the oven-valve assembly 10.

As illustrated in FIG. 5, the cylindrical oven chamber 31 within the metal wall 30 is subdivided at its approximate axial midpoint by a pair of circular partition discs 44, 45 of asbestos which are in fixed coaxial relation to the wall. Discs 44, 45 are provided adjacent their outer perimeter with four aligned openings 46, equally spaced circumferentially, through which the through-bolts 40 extend, and the right-hand end partition 44 is further provided with a central hole 48.

Hole 48 is in axial alignment with a hole 49 of the same size in the right-hand or outer end wall 37; and a conventional elongated electrical immersion heater 50 of, say, 300 watt rating is loosely and removably received in the holes 48, 49. This unit is designed to heat the oven space 31 to an appropriate temperature, for instance 250° C.–300° C.

An elongated tubular shield 52 is adapted to concentrically surround the inner end portion of the inserted heater 50, being fixedly engaged at its opposite ends between the inner or left-hand end oven wall 36 (FIG. 5) and the partition 44. A protective filter screen 53 is mounted by a spacer 54 just within the left-hand end of shield 52; and a bent Pyrex tube 55 opens to the interior of shield 52, outwardly of screen 53. Thus, a too-direct radiation of intense heat from the immersion heater 50 is controlled initially by a variable auto-transformer (not shown), in combination with the tube 55 at oven wall 36 employed to forcedly or naturally circulate heated air in oven chamber 31 in the direction from wall 36 to the center of the cylindrical oven wall 30.

A resistive element (not shown) of the immersion heater 50 is adapted to be electrically energized through a conductor cable 57, which may be plugged into a variable auto-transformer or "Powerstat" (not shown). Again referring to FIGS. 3 and 5, the outer end wall 37 of oven 12 and also each of the partitions 44, 45 may be provided with a small hole 60 for the reception of a suitable temperature measuring instrument such as an electrical thermocouple (not shown), or even an ordinary 360° C. thermometer, to obtain a reading of the internal oven temperature.

Each of the four sample-receiving vessels 16 contemplated for use in association with the illustrated embodiment of the oven 12 is preferably comprised of a standard six inch (150 mm.) Pyrex test tube 63 (see FIG. 5) having a neoprene cap or plug 64 which is tightly applicable to its open end to vacuum-seal its interior. Each plug includes an integral, penetrable cross wall 65 for a purpose to be described; and in use a pledge 66 of glass wool is inserted within the mouth of the vacuum tube 63 to prevent the compound being dried therein from being sucked out.

The inner or left-hand oven end wall 36 is provided with four circular holes 68 equally spaced circumferentially from one another about the over axis, these holes being of sufficient diameter to removably receive the vacuum sample vessels 16; and the dual partition discs 44, 45 are both apertured at 69 in axial alignment with the respective holes 68 to likewise receive the best tubes 63. The radial clearance of holes 68 and 69 relative to the tubes is sufficient to permit free rotation of each of the later about its own individual axis. Drive provisions to effect such rotation will be hereinafter described.

Now referring to FIGS. 1, 2 and 6 of the drawings, the multiple check valve unit 14 is shown to comprise a pair of rigid and rugged upright blocks 71, 72 which in effect constitute parts of a housing structure for four similar tubular ball check valve components, each generally designated 74. Blocks 71, 72 are of square outline and relatively thick cross section. The right-hand block 71 is provided with four parallel vacuum passages 75 equally spaced circumferentially from one another about its center, and the outer end of each passage 75 threadedly receives a friction nipple 76 to which a small flexible vacuum hose 77 is applied. Each such hose receives at its own outer end the body or fitting 78 of a standard #21 hypodermic needle 79; as shown in FIG. 5, each needle 79 is adapted to penetrate the center of the cross-wall 65 of the test tube's closure cap or plug 64, thus placing the vacuum passages 75 of multiple check valve unit 14 in communication with the interior of the four vacuum vessels or tubes 16.

Again referring to FIG. 6, the vacuum passages 75 are each counterbored at 81 to receive tightly one end of a small elongated valve tube 82 of transparent glass, which is tightly fitted internally and at its opposite end with a tubular valve seat plug 83 of rubber; and a check ball 84 is adapted to engage and seal the bore of this plug in the event of an implosion, as previously and hereinafter discussed. The seat end of each valve 82 is tightly received in the counterbore 85 of a second vacuum passage 86 in the second valve housing 72, four of the passages 86 being provided in respective alignment with the vaccum passages 75 of the other block 71.

Passages 86 open to a vacuum cavity 87 in block 72; and the cavity 87 is sealed from the left (FIG. 6), by an appropriate gasket 88 backed by a rigid clamp block 89. Four threaded through-bolts 91 extend through aligned openings in the several blocks 71, 72 and 89 to compress these parts tightly, with the transparent valve tubes 82 sealed between the former two. Additional nuts 92 threaded on bolts 91 clamp the blocks 72 and 89 tightly together to gasket-seal the vacuum cavity 87. Suitable means (not shown) are provided to mount the multiple valve unit 14 constituted by the above-described parts rigidly upon the carriage 20 of the equipment.

Vacuum chamber 87 communicates laterally through a small port 94 in valve housing block 72 with an upright fitting 95, which is in turn adapted to be communicated by appropriately designed flexible tubing (not shown) with an appropriate vacuum pump (also not shown), preferably one rated to produce a 0.0 mm. vacuum, nominal.

It is contemplated that each of the valve tubes 82 may contain a suitable small moisture indicator element, such as a bit of paper 96 specially treated chemically to change in color or hue when there is a change in the moisture content in the tube, thereby enabling the technician to virtually ascertain this fact.

The multiple valve unit 14 also serves to receive part of the provisions for simultaneously rotating all of the vacuum-serviced test vessels 16 about their individual axes, in the manner and for the purpose described above. Thus, as shown in FIGS. 1 and 2, the drive motor 18 may be energized through a conductor (not shown). The output shaft of motor 18 is conventionally connected through a right angle speed reducer 97 to a small pinion 98 on the shaft of the reducer; which pinion meshes with a larger diameter gear 99 backed by anti-friction axial thrust balls 100. Gear 99 is fixed to a shaft (not shown) journalled in an appropriate bearing 102 fixedly based on the carriage 20; and suitable guard means (not shown) will be provided to perimetrally encircle pinion 98 and gear 99 for the sake of safety.

As best shown in FIG. 6, the shaft of drive gear 99 is received through a metal extension tube 103 for the gear shaft bearing 102, the tube 103 being fixedly mounted in aligned center holes of the valve housing blocks 71, 72, 89 and terminating approximately flush with the side of block 71 which faces the oven 12. In this zone, the shaft has a reduced diameter end portion 104 which is fixedly secured within an adjacent end of a flexible drive cable 105, with a series of washers 106 interposed between this cable end and the adjacent end of the bearing extension 103.

The opposite end of flexible cable 105 frictionally and fixedly receives, as appears in FIGS. 1 and 2, a stem 108 which is, at its own opposite end, coaxially received in a center bore of a rotative friction drive head 109, which is thus axially slidable relative to the stem or pin. A coil compression spring 110 surrounds the stem 108 and acts under axial compression between the drive head 109 and a small washer 111 which surrounds the pin and abuts an end of the flexible cable 105.

Now referring to FIG. 5 of the drawings, the friction drive head 109 is shaped to provide a quasi-spherical drive nose 113 centrally equipped with an axially projecting, tubular drive socket 114. This socket is in fixed relation to the head 109, surrounding the end of stem 108 and has a slot 115 which receives a small cross pin 115' on the stem. Thus the socket fixed on drive head 109 is drivingly coupled to the flexible shaft stem 108, yet head 109 may float axially on the stem under the bias of spring 110. The pin 115' prevents separation of socket 114 and stem 108.

Considering FIG. 4 in conjunction with FIG. 5, the two ply asbestos end wall 36 of the oven 12 fixedly carries an external, rigid cross or bridge piece 116. The piece 116 extends diametrically across the axis of the oven chamber, and is mounted at its opposite ends in outwardly spaced relation to the wall 36 through the agency of bolts or studs 117 on the wall and a number of interposed shim members 118. At its center point, the cross piece 116 fixedly carries a suitable fitting 120 (FIG. 5) coaxial with the oven chamber 31, which fitting 120 presents a small projecting stud 121 of a diameter to be received as a journal pin in the bore of the drive socket 114 on friction drive head 109.

Thus the drive connections from the reduced speed motor output gear 99 terminate in a center bearing at the drive socket and journal pin 121 which is exactly equidistant radially from the holes or openings 68 (FIG. 5) in the oven wall 36 which receive the test tube vacuum vessels 16. As thus positioned, the quasi-spherical drive nose 113 of friction head 109 snugly engages outwardly against the perimeter of each of the closure caps or plugs 64 for the four test tubes 63, under sufficient force to rotate the latter frictionally about their individual axes. The closed ends of the tubes, as thus driven, will abut the inner side of the outer double ply oven end wall 37. Accordingly, the assayed samples in the tubes 63 are continuously tumbled in rotation, through the agency of the speed reduction gearing 97, 98, 99, at a relatively low, non-centrifugal rate for an efficient, quick and uniform drying thereof by the immersion heater 50, at the lowest possible temperature in order to avoid decomposition of the sample.

It is believed that the operation, mechanical-wise and thermal-wise, of the equipment designated 10 will be evident from the foregoing description. To summarize briefly matters which have not been particularly emphasized, should an implosion of one or more of the vacuum sample vessels 16 occur under existing operating conditions of temperature and vacuum pressure, the check ball 84 of its associated tubular valve component 74 will instantaneously engage and seal under atmospheric pressure against the valve seat 83, thus isolating the damaged vessel 16 from the remainder. Hence the multiple check valve unit 14 insures that in no event will air enter the main vacuum circuit; and accordingly, even after the perhaps unlikely breakage of a sample tube 63, the drying of samples in the remaining sound tubes will continue unimpaired, and without possibility of contamination.

Naturally, it is well to observe precautions at the outset to prevent an implosion, and this may be done simply by encasing each test tube 63 in a length of steel pipe, then evacuating it of air, in the same manner as in the test procedure to be described. However, it is still advisable to incorporate the multiple check valve unit 14 in the equipment, if for no other reason than to prevent interruption of the vacuum pump pressure circuit as the result of an implosion.

As indicated above, the presence of an indicator 96 in the transparent valve tubes 82 of the unit 14 will afford a visible signal when approximate dehydration of the sample is reached. The shield 52 and air circulating tube 55 associated with the oven unit 12 insure a uniform application of heat to the vacuum sample vessels 16; and the uniform drying of their contents is promoted by tumbling the latter in the simutaneous rotation of all the vessels by the motor-driven friction drive nose 113.

As will appear to those skilled in the art, the equipment of the invention provides a means for the determination of dehydration rates (i.e., water loss at various temperatures in overall time or per unit of time). Such determination will, in carrying into effect the method of the invention, involve procedures now to be described.

Each test tube 63 of each sample vessel 16 to be employed in the check, along with its glass wool pledge 66 and neoprene sealing cap or plug 64, is first accurately weighed on an analytical balance. The sample to be assayed is then introduced into the test tube, the pledge is positioned appropriately in the test tube in accordance with the nature and/or volume of the sample, and the cap 64 is tightly applied to the open end of the tube. Thus charged, the tube 63 is weighed (serving at this time as a weighing dish in addition to its function as a vacuum vessel), and the difference in the recorded weights represents the weight of the sample.

Preliminary assays were made on two pulverized samples of $FeSO_4 \cdot 7H_2O$, designated as Sample #1 and Sample #2. On the assumption of no significant existing oxidation of the samples prior to drying them, the assay results were subtracted from 100% to give a theoretical "water of hydration" content as follows:

|  | Assay Values (percent $FeSO_4$) | Theoretical Water of Hydration (100% less Assay) |
| --- | --- | --- |
| Sample #1 | 55.36% and 55.45% | 44.59% $H_2O$ |
| Average | 55.41% $FeSO_4$ | |
| Sample #2 | 54.86% and 54.86% | 45.14% $H_2O$ |
| Average | 54.86% $FeSO_4$ | |

Now, pursuant to the general operating procedure described above, 2 grams of Sample #1 and 1 gram of Sample #2 of the hydrate were weighed accurately and placed in their respective test tubes 63. The glass wool pledge was positioned (in this instance) about ⅓ of the way from the mouth of the tube, and the neoprene cap was then applied to seal air within the tube. Hypodermic needles 79 were then inserted centrally through the walls 65 of the two caps, and a vacuum pump was operated to apply vacuum to the vessels.

When the pump manometer registered zero millimeters of mercury, the vessels 16 were fully inserted in oven wall holes 68 and, with the motor 18 energized to rotate the vessels, they were heated at 70° C.–80° C. for a first two hours. Then, while still maintaining the same vacuum condition, the temperature was gradually raised at a rate of 1.5° C.–2.0° C. per minute over a two hour period up to 250° C., at which it was maintained for an additional two hours.

The results proved very close to the theoretical water of hydration content tabulated above, being as follows:

|  | Theoretical Water of Hydration | Water Removed by above procedure |
| --- | --- | --- |
| Sample #1 | 44.59% $H_2O$ | 44.72% and 44.54% |
| Average | | 44.63% $H_2O$ |
| Sample #2 | 45.14% $H_2O$ | 45.22% and 45.10% |
| Average | | 45.16% $H_2O$ |

Assays were then conducted on the dehydraded samples, and the results follow:

Sample #1 _____ 99.44% and 99.46%.
   Average _____ 99.45% as $FeSO_4$.
Sample #2 _____ 99.88% and 99.78%.
   Average _____ 99.83% as $FeSO_4$.

Thus, a method has been developed for ascertaining the water of hydration content of a hydrate to within 0.05% of theory, which method practically if not entirely eliminates the possibility of oxidation while dehydrating the sample, and affords a way to determine dehydration time rates. In this connection, further steps were next taken to minimize the overall time necessary for the dehydration.

Two 1-gram portions of Sample #2 were each accurately weighed in the vessels 16; air in the latter was substantially completely removed by the vacuum pump. With this vacuum maintained, the vessels were initially introduced into the oven, which had been brought to 250° C., and kept there for two hours at that temperature, the tubes being rotated in the normal fashion. "Loss on dehydration" and assay results thereupon reached are as follows:

|  | Loss on dehydration | Assay after dehydration |
| --- | --- | --- |
| Sample #2 | 45.21% and 45.32% | 99.74% and 99.55% |
| Average | 45.27% | 99.65% |

The conclusion is, giving consideration to all parameters of the method described and the results obtained thereby, that a cycle of only two hours heating at 250° C. under a near-perfect vacuum will effect a complete dehydration of $FeSO_4 \cdot 7H_2O$ without significant or any oxidation, discoloration or decomposition.

Essentially then, the novel method calls for the heating at but moderate temperature of a hydrate compound sample, or other liquid containing mass, in a vacuum vessel whose internal volume exceeds by only a relatively small multiple (if that much) the volume of the sample or mass heated, as compared with the vastly greater oven volume-to-sample volume ratios commonly involved in present day practice. This principle makes possible the application of high vacua, indeed, with the advantages of speed, safety and economy hereinabove referred to. The same performance may be expected in the vacuum-heating and/or assaying of hydrates other than ferrous sulfate, such as are widely analyzed in industrial and institutional laboratories.

Accordingly, the procedure or method and the equipment of the invention will prove a valuable asset to any such laboratory, in particular where considerations of accuracy combined with speed and avoidance of high temperature decomposition must or should be heeded. Furthermore, in sharp contrast to existing laboratory equipment, the apparatus 10 of the invention is small and compact, inexpensive of production and, in particular, portable as to its oven, which contributes greatly to convenience in use.

What I claim as my invention is:

1. A method of rapidly drying and determining the liquid content of a mass, comprising oven heating at least a portion of said mass in a sealed vacuum vessel of but little greater internal volume than the volume of the mass portion heated, the weights of the latter and of the sealed vessel being known, and, during heating, applying a high value of vacuum to the interior of the sealed vessel, and, using the sealed vessel as a weighing receptacle, determining the weight of the content of the vessel after a period of heating under vacuum sufficient to substantially completely de-liquify said mass.

2. A method of rapidly drying and determining the liquid content of a mass, comprising oven heating at least a portion of said mass in a sealed vacuum vessel, the weights of said mass portion and of the sealed vessel being known, and, during heating, applying a high value of vacuum to the interior of the sealed vessel, while moving the latter to tumble the heated content thereof, and, using the sealed vessel as a weighing receptacle, determining the weight of said content after a period of heating under vacuum sufficient to substantially completely de-liquify said mass.

3. A method of rapidly determining the water of hydration of a hydrate compound, comprising oven heating a sample of said compound in a sealed vacuum vessel of but little greater internal volume than the volume of the sample heated, and, during heating, applying a high value of vacuum to the interior of the sealed vessel, while moving the latter at a relatively low rate to tumble the heated sample.

4. A method of rapidly determining the water of hydration of a hydrate compound, comprising oven heating a sample of said compound in a sealed vacuum vessel of but little greater internal volume than the volume of the sample heated, the weights of the latter and of the sealed vessel being known, and, during heating, applying a high value of vacuum to the interior of the sealed vessel, and, using the sealed vessel as a weighing receptacle, comparing the weight of the vessel and its heated sample, after a period of heating under vacuum sufficient to substantially completely dehydrate said sample, with that of the vessel and the hydrate compound, thus to determine the content of driven-off water of hydration.

5. A method of rapidly determining the water of hydration of a hydrate compound, comprising oven heating a sample of said compound in a sealed vacuum vessel of but little greater internal volume than the volume of the sample heated, the weights of the latter and of the sealed vessel being known, and, during heating applying a high value of vacuum to the interior of the sealed vessel, while moving the latter at a relatively low rate to tumble the heated sample, and, using the sealed vessel as a weighing receptacle, comparing the weight of the vessel and its heated sample, after a period of heating under vacuum sufficient to substantially completely dehydrate said sample, with that of the vessel and the hydrate compound, thus to determine the content of driven-off water of hydration.

6. Apparatus for drying material, comprising a small oven having means to receive a heater in a heating chamber thereof, a vessel in said chamber vacuum-sealed from the atmosphere of the latter, said vessel being adapted to contain material to be dried by said heater under a high value of vacuum in said vessel, the volumetric capacity of said vessel not greatly exceeding the volume of the material content thereof to enable the ready attainment of said high value of vacuum, and means to connect the vessel interior to a vacuum source.

7. Apparatus for drying material, comprising a small oven having means to removably receive a heater in a heating chamber thereof, a vacuum-sealed vessel removably received in said chamber and adapted to contain material to be dried by said heater under a high value of vacuum in said vessel, the volumetric capacity of said vessel not greatly exceeding the volume of the material content thereof to enable the ready attainment of said high value of vacuum, said vessel having a penetrable sealing closure, and means to penetrate said sealing closure and connect the vessel interior to a a vacuum source.

8. Apparatus for drying material, comprising a small oven having means to removably receive a heater in a heating chamber thereof, a vacuum-sealed vessel removably received in said chamber and adapted to contain material to be dried by said heater under a high value of vacuum in said vessel, the volumetric capacity of said vessel not greatly exceeding the volume of the material content thereof to enable the ready attainment of said high value of vacuum, said vessel having a penetrable sealing closure, and means to connect the vessel interior to a vacuum source, including a check valve-controlled vacuum line provided with a hypodermic needle to penetrate the closure.

9. Apparatus for drying material, comprising a small oven having means to receive a heater in a heating chamber thereof, a vessel in said chamber vacuum-sealed from the atmosphere of the latter, said vessel being adapted to contain material to be dried by said heater under a high value of vacuum in said vessel, the volumetric capacity of said vessel not greatly exceeding the volume of the material content thereof to enable the ready attainment of said high value of vacuum, means to connect the vessel interior to a vacuum source, and means to tumble the content of the vessel during heating thereof under the high vacuum.

10. Apparatus for drying material, comprising a small oven having means to removably receive a heater in a heating chamber thereof, a vacuum-sealed vessel removably received in said chamber and adapted to contain material to be dried by said heater under a high value of vacuum in said vessel, the volumetric capacity of said vessel not greatly exceeding the volume of the material content thereof to enable the ready attainment of said high value of vacuum, said vessel having a penetrable sealing closure, means to connect the vessel interior to a vacuum source, including a check valve-controlled vacuum line provided with a hypodermic needle to penetrate the closure, and means to agitate the content of the vessel during heating thereof under the high vacuum.

11. Apparatus for drying materials, comprising an oven having means to heat the interior thereof, means to position a plurality of individual heating vessels in said interior for individual rotation, means to so rotate said vessels simultaneously, each of said vessels having a vacuum closure to seal therewithin a mass of the material to be dried, and individual vacuum lines each having means to communicate one of the respective vessel interiors with a source of vacuum, said vessel rotating means engaging the respective vessels to rotate the latter while being thus evacuated and heated.

12. Apparatus for drying materials, comprising an oven having means to heat the interior thereof, means to position a plurality of individual heating vessels in said interior, each of said vessels having a penetrable vacuum closure to seal therewithin a mass of the material to be dried, and individual vacuum lines each having means to penetrate the respective vessel closures and communicate one of the respective vessel interiors with a source of vacuum.

13. Apparatus for drying materials, comprising an oven having means to heat the interior thereof, means to position a plurality of individual heating vessels in said interior for individual rotation, means to so rotate said vessels simultaneously, each of said vessels having a penetrable vacuum closure to seal therewithin a mass of the material to be dried, and individual vacuum lines each having means to penetrate the respective vessel closures and communicate one of the respective vessel interiors with a source of vacuum, said vessel rotating means engaging the respective vessels to rotate the latter while being thus evacuated and heated.

14. Apparatus for drying materials, comprising an oven having means to heat the interior thereof, means to position a plurality of individual heating vessels in said interior for individual rotation, means to so rotate said vessels simultaneously, each of said vessels having a penetrable vacuum closure to seal therewithin a mass of the material to be dried, individual vacuum lines each having means to penetrate the respective vessel closures and communicate one of the respective vessel interiors with a source of vacuum, and a check valve between said line and said source, said vessel rotating means engaging the closures of the respective vessels to rotate the latter while being thus evacuated and heated.

15. Apparatus for drying materials, comprising a small portable oven having means to removably receive a heater in a heating chamber in the oven, means to removably position a plurality of individual heating vessels in said chamber for individual rotation about parallel axes, means to so rotate said vessels simultaneously, each of said vessels having a penetrable end closure to seal therewithin a mass of the material to be dried, and individual hypodermic vacuum-connected members to penetrate the respective vessel closures.

16. Apparatus for drying materials, comprising a small portable oven having means to removably receive a heater in a heating chamber in the oven, means to removably position a plurality of individual heating vessels in said chamber for individual rotation about parallel axes, means to so rotate said vessels simultaneously, each of said vessels having a penetrable end closure to seal therewithin a mass of the material to be dried, individual hypodermic members to penetrate the respective vessel closures, and a valve unit connecting said members to a vacuum source, said valve unit including individual vacuum lines each provided with a check valve and in communication with one of said respective hypodermic members.

17. Apparatus for drying materials, comprising a small portable oven having means to removably receive a heater substantially centrally in a heating chamber in the oven, means to removably position a plurality of individual heating vessels in said chamber in equally spaced circumferential relation to one another about said heater for individual rotation about parallel axes, means to so rotate said vessels simultaneously, each of said vessels having a penetrable end closure to seal therewithin a mass of the material to be dried, and individual hypodermic vacuum-connected members to penetrate the respective vessel closures.

18. Apparatus for drying materials, comprising a plurality of individual heating vessels, each of said vessels having a closure to vacuum seal therewithin a mass of the material to be dried, individual members adapted to communicate the respective vessel interiors with a source of vacuum, and a valve unit to connect said members with said source, including individual vacuum lines each provided with a check valve and in communication with one of said respective communicating members.

19. Apparatus for drying materials, comprising an oven heaving means to removably receive a plurality of individual heating vessels, each of said vessels having a closure to vacuum seal therewithin a mass of the material to be dried, individual members adapted to communicate the respective vessel interiors with a source of vacuum, and a valve unit to connect said members with said source, including individual vacuum lines each provided with a check valve and in communication with one of said respective communicating members.

References Cited by the Examiner
UNITED STATES PATENTS

| | | | |
|---|---|---|---|
| 934,772 | 9/1909 | Urgelles | 34—87 |
| 1,014,601 | 1/1912 | Looram | 312—31.2 |
| 1,589,504 | 6/1926 | Agoplan | 34—92 |
| 1,627,883 | 5/1927 | Blair | 312—31 |
| 1,858,409 | 5/1932 | Mittelsteiner | 73—73 |
| 2,023,468 | 12/1935 | Dietrich | 34—92 |
| 2,126,426 | 8/1938 | Traube | 34—92 |
| 2,290,355 | 7/1942 | Reichel | 34—5 |
| 2,360,108 | 10/1944 | Christie | 34—92 |
| 2,411,152 | 11/1946 | Folsom | 34—92 |
| 2,461,206 | 2/1949 | Fouse | 123—119 |
| 2,569,734 | 10/1951 | Saalfrank | 103—228 |
| 2,574,298 | 11/1951 | Smity | 34—92 |
| 2,676,417 | 4/1954 | Ekelund | 137—599.2 |
| 2,709,914 | 6/1955 | Brabender | 73—76 |
| 2,803,888 | 8/1957 | Orletti | 34—5 |
| 2,878,581 | 3/1959 | Turato | 34—92 |
| 2,976,722 | 3/1961 | Heckly | 73—76 |
| 3,009,258 | 11/1961 | Taylor | 34—92 |
| 3,057,078 | 10/1962 | Gold | 34—92 |
| 3,199,216 | 8/1965 | Broadwin | 34—92 |
| 3,203,108 | 8/1965 | Broadwin | 34—92 |

WILLIAM J. WYE, *Primary Examiner.*